United States Patent [19]

Schindler et al.

[11] 3,865,886

[45] Feb. 11, 1975

[54] PRODUCTION OF ALLYL CHLORIDE

[75] Inventors: Harvey D. Schindler, Paterson; Morgan C. Sze, Upper Montclair; Herbert Riegel, Maplewood, all of N.J.

[73] Assignee: The Lummus Company, Bloomfield, N.J.

[22] Filed: June 20, 1973

[21] Appl. No.: 371,615

[52] U.S. Cl. ...... 260/654 R, 260/654 H, 260/654 D, 260/659 R, 260/660, 260/658 R, 260/DIG. 42
[51] Int. Cl. ............................................. C07c 21/04
[58] Field of Search..... 260/DIG. 42, 654 A, 654 R, 260/654 D, 654 H, 659 A, 659 R, 658 R, 660

[56] References Cited
UNITED STATES PATENTS
3,763,263    10/1973    Sze et al. ........................ 260/660

*Primary Examiner*—Delbert E. Gantz
*Assistant Examiner*—Joseph Boska
*Attorney, Agent, or Firm*—Marn & Jangarathis

[57] ABSTRACT

Propane is chlorinated in the presence of a molten salt to allyl chloride and other chlorinated $C_3$ hydrocarbons. Isomers of allyl chloride are hydrochlorinated to dichloropropanes, and dichloropropane is dehydrochlorinated to allyl chloride and its isomers. Hydrogen chloride generated in the dehydrochlorination is recycled to the hydrochlorination and dehydrochlorination steps.

18 Claims, 2 Drawing Figures

PRODUCTION OF ALLYL CHLORIDE

This invention relates to the chlorination of propane, and more particularly, to a new and improved process for producing allyl chloride.

In general, allyl chloride is produced by the chlorination of propylene with gaseous chlorine. In such a process, hydrogen chloride and chlorinated propanes other than allyl chloride are produced as net by-product. In many cases, there is not a ready available market for such by-products and, accordingly, there is a need for a process which produces essentially only allyl chloride as net product.

An object of the present invention is to provide a new and improved process for producing allyl chloride.

Another object of the present invention is to provide a process for producing allyl chloride from propane.

A further object of the present invention is to provide a process for producing allyl chloride without net production of hydrogen chloride.

Figure 1:
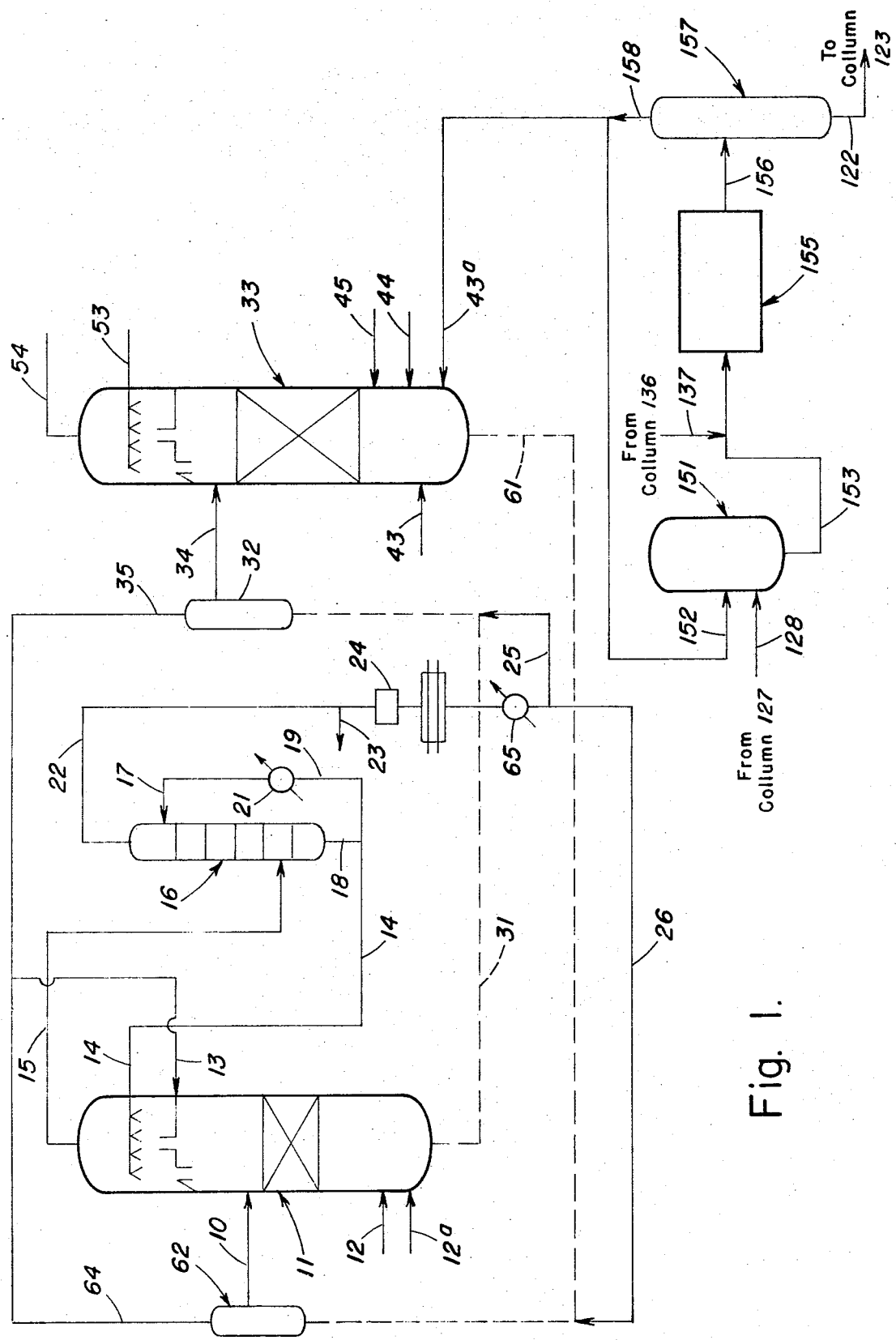
Figure 2:
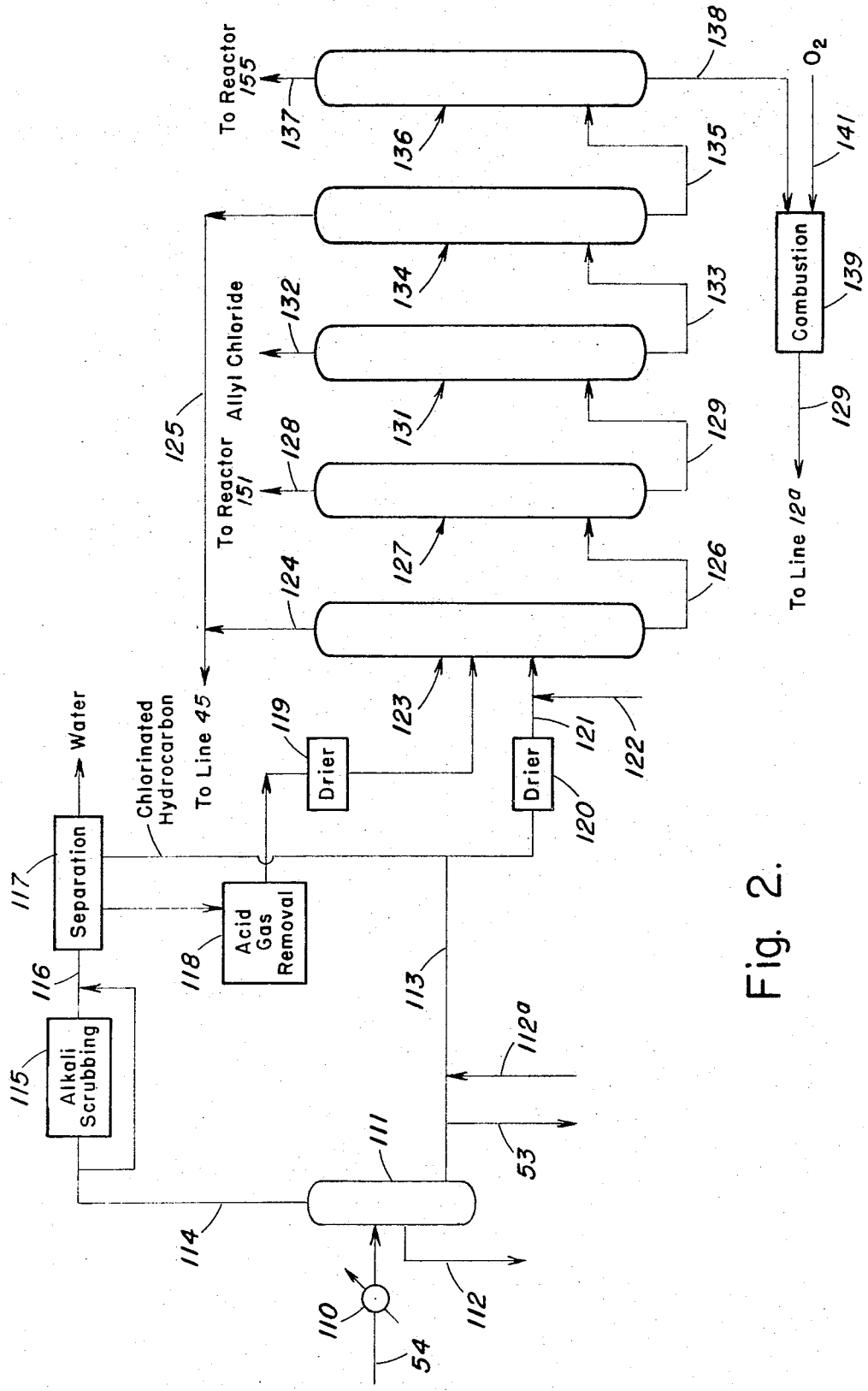

These and other objects of the present invention should be more apparent from reading the following detailed description thereof with reference to the accompanying drawings wherein:

FIG. 1 is a simplified schematic flow diagram of a portion of an embodiment of the present invention; and FIG. 2 is a simplified schematic flow diagram of the remaining portion of the embodiment of FIG. 1.

The objects of the present invention are broadly accomplished, in one aspect, by producing allyl chloride from propane by use of a molten mixture containing the higher and lower valent forms of a multivalent material chloride and oxychloride of the metal.

More particularly, propane is contacted with hydrogen chloride and/or chlorine and the molten mixture to produce a reaction effluent including allyl chloride, isomers of allyl chloride (1-chloropropylene and/or 2-chloropropylene), dichloropropane (the term "dichloropropane" generically refers to one or more of the isomers of dichloropropane), chloropropane (the term "chloropropane" generically refers to 1- and 2- chloropropane). Chloropropanes, propylene and unreacted propane are recovered and recycled to the propane chlorination step for ultimate conversion to allyl chloride. The isomers of allyl chloride are hydrochlorinated to dichloropropane and the resulting dichloropropane, in conjunction with dichloropropane produced from the chlorination of propane, is dehydrochlorinated to allyl chloride and isomers of allyl chloride. The isomers of allyl chloride are recycled to the hydrochlorination step, the allyl chloride is recovered as product and the hydrogen chloride generated in the dehydrochlorination is recycled to the propane chlorination and/or hydrochlorination step. In this manner, essentiallly all of the chlorine and propane values are ultimately recovered as allyl chloride.

The melt contains a chloride of a multivalent metal; i.e., a metal having more than one positive valence state, such as manganese, iron, copper, cobalt, and chromium, preferably copper. In the case of higher melting multivalent metal chlorides, such as copper chlorides, a metal salt melting point depressant which is non-volatile and resistant to the action of oxygen at the process conditions, such as a chloride of a univalent metal, i.e., a metal having only one positive valence state, is added to the multivalent metal chloride to form a molten salt mixture having a reduced melting point. The univalent metal chlorides, are preferably alkali metal chlorides, such as potassium and lithium chloride in particular, but it is to be understood that other metal chlorides and mixtures thereof, such as the heavy metal chlorides, i.e., heavier than copper, of Groups I, II, III and IV of the Periodic Table; e.g., zinc, silver, and thallium chloride, may also be employed. The metal chloride melting point depressant is added in an amount sufficient to maintain the salt mixture as a melt at the reaction temperatures, and is generally added in an amount sufficient to adjust the melting point of the molten salt mixture to a temperature of below about 500°F. In the case of a salt mixture of copper chlorides and potassium chloride, the composition of the melt ranges between about 20% and about 40%, preferably about 30%, by weight, potassium chloride, with the remainder being copper chlorides. It is to be understood, however, that in some cases the catalyst melt may have a melting point higher than 500°F., provided the catalyst remains in the form of the melt throughout the processing steps. It is further to be understood that the melt may contain a mixture of multivalent metal chlorides or other reaction promoters. It is also to be understood that in some cases, the metal chloride may be maintained as a melt without the addition of a melting point depressant.

The reactions which are effected in the chlorination reaction zone are believed to be represented by the following equations, using copper chloride as a representative multivalent metal chloride:

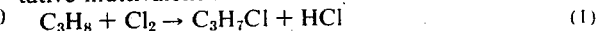
$C_3H_8 + Cl_2 \rightarrow C_3H_7Cl + HCl$ (1)
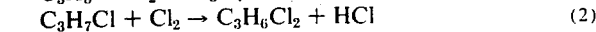
$C_3H_7Cl + Cl_2 \rightarrow C_3H_6Cl_2 + HCl$ (2)
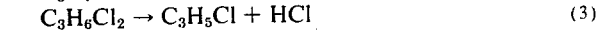
$C_3H_6Cl_2 \rightarrow C_3H_5Cl + HCl$ (3)
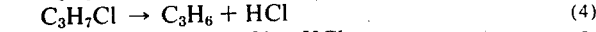
$C_3H_7Cl \rightarrow C_3H_6 + HCl$ (4)
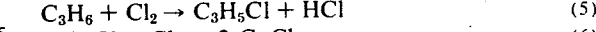
$C_3H_6 + Cl_2 \rightarrow C_3H_5Cl + HCl$ (5)
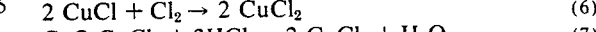
$2\ CuCl + Cl_2 \rightarrow 2\ CuCl_2$ (6)
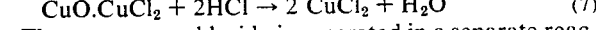
$CuO \cdot CuCl_2 + 2HCl \rightarrow 2\ CuCl_2 + H_2O$ (7)

The copper oxychloride is generated in a separate reaction zone by contacting the molten mixture containing cuprous and cupric chloride with molecular oxygen, generally introduced as air, as represented by the following equation:

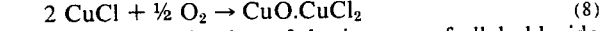
$2\ CuCl + ½\ O_2 \rightarrow CuO \cdot CuCl_2$ (8)

The hydrochlorination of the isomers of allyl chloride (1-chloropropylene and/or 2-chloropropylene) is represented by the following equation:

$C_3H_5Cl + H\ Cl \rightarrow C_3H_6Cl_2$

The dehydrochlorination of dichloropropane is represented by hereinabove equation (3). The overall reaction for producing allyl chloride may be represented by the following equation:

$C_3H_8 + H\ Cl + O_2 \rightarrow C_3H_5Cl + 2\ H_2O$
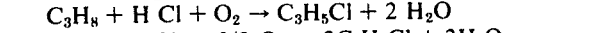
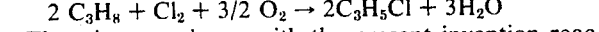
$2\ C_3H_8 + Cl_2 + 3/2\ O_2 \rightarrow 2C_3H_5Cl + 3H_2O$ Thus, in accordance with the present invention reaction intermediates produced during the chlorination of propane, including chloropropane, isomers of allyl chloride, dichloropropane, and propylene, are ultimately converted to allyl chloride.

The chlorination of propane and recycle products is generally effected in the chlorination reaction zone, in the presence of the molten mixture, at a temperature from about 700°F., to about 950°F., and preferably from about 750°F., to about 950°F., and at pressures from about 1 to about 20 atmospheres. The contacting of the feed and melt is generally effected in a countercurrent fashion, preferably with the feed as a continuous vapor phase, at residence times from about 1 to about 30 seconds, although longer residence times may be employed. The molten mixture is contacted with molecular oxygen, in the oxidation reaction zone, at a temperature from about 700°F., to about 950°F., preferably from about 750°F., to about 950°F. and at pressures from about 1 to about 20 atm.

It should be apparent from the hereinabove noted reaction sequences, that the melt containing the multivalent metal chloride, in some cases, participates in the reaction sequence and accordingly, does not behave only as a catalyst. Thus, for example, the melt functions to transfer oxygen, and as should be apparent from the hereinabove noted equations, sufficient oxychloride must be produced to provide the oxygen requirements for the reactions, such requirements being greater for hydrogen chloride as compared to chlorine. In general, the oxychloride content of the molten mixture introduced into the chlorination reactor ranges from about 0.5% to about 6%, and preferably from about 1.0% to about 6% all by weight, of the melt.

The melt, in addition to functioning as a reactant and/or catalyst is a temperature regulator. Thus, the circulating melt has a high heat absorption capacity, thereby preventing runaway reaction during the exothermic chlorination and oxygen-contacting steps. The absorbed heat of reaction may be employed to both heat the various reactants to reaction temperature and supply heat for the endothermic dehydrochlorination. It should be apparent, however, that if additional heating or cooling is required such heating or cooling may be supplied from an external source. It should also be apparent that the heat absorption capacity of the melt functions to limit temperature variations, i.e., temperature gradients, during the reactions.

The hydrochlorination of 1-chloropropylene and/or 2-chloropropylene to dichloropropane is effected as known in the art. In general, the 1- and/or 2-chloropropylene and hydrogen chloride are reacted at a temperature from about 100°F. to about 400°F. in the presence of a suitable hydrochlorination catalyst, such as, $CuCl_2$, $SnCl_2$, $ZnCl_2$, $BCl_3$, and preferably $SbCl_3$ catalyst.

The hydrochlorination is represented by the following equation: $C_3H_5Cl + HCl \rightarrow C_2H_6 Cl_2$ The details of the hydrochlorination reaction form no part of the present invention and in view of the fact that this general type of reaction is well-known in the art no further details in this respect is deemed necessary for a complete understanding of the present invention.

The dichloropropane produced in the chlorination and hydrochlorination may be dehydrochlorinated to chloropropylene, as known in the art. The dehydrochlorination may be effected thermally or catalytically with the thermal dehydrochlorination being preferred. In general, the dehydrochlorination of dichloropropane is effected at a temperature from about 500°F. to about 1,000°F. in a conventional dehydrochlorination furnace. It is also to be understood that the dehydrochlorination could be effected in the presence of a molten salt mixture of a multivalent metal chloride in its higher and lower valence state, as described in U.S. Application Ser. No. 94,536 filed on Dec. 2, 1970.

The details of the dehydrochlorination reaction form no part of the present invention, and in view of the fact that this general type of reaction is well-known in the art, no further details in this respect is deemed necessary for a complete understanding of the present invention.

In accordance with a preferred embodiment of the invention, allyl chloride is produced from a net feed of propane, molecular oxygen and chlorine and/or hydrogen chloride, using copper chlorides as the molten salt mixture, with the intermediate products produced during the reaction being effectively converted to allyl chloride.

The molten salt mixture, preferably containing from about 20% to about 40% potassium chloride, as a melting point depressant, with the remainder being copper chlorides, all by weight, is contacted in a first reaction zone with molecular oxygen to produce copper oxychloride. The cupric chloride content of the melt is generally at least about 15%, by weight, of the melt, and generally from about 17% to about 35%, by weight, in order to provide sufficient cupric chloride for the subsequent chlorination and dehydrochlorination reactions. It is to be understood, however, that lower amounts of cupric chloride may also be employed by increasing salt circulation rates and residence times. As a result of the various reactions which occur during the chlorination step, the cupric chloride content of the melt does not significantly vary through the various reaction zones. The molecular oxygen is preferably introduced in an amount, and at a rate, to provide a molten salt mixture containing from about 1.4% to about 12%, preferably from about 2.5% to about 12%, all by weight, of copper oxychloride. It is to be understood that minor amounts of chlorine and/or hydrogen chloride could also be introduced into the first reaction zone, but in accordance with this preferred embodiment, the major portion of the chlorine and/or hydrogen chloride is added to the chlorination zone.

The molten salt mixture, now containing copper oxychloride, is circulated to a second reaction zone (chlorination zone) wherein the molten salt is contacted with propane and chlorine and/or hydrogen chloride as fresh feed, in addition to recycle unconverted propane, recycle hydrogen chloride from the dehydrochlorination of dichloropropanes and recycle propyl chloride generated as reaction intermediates. The chlorine and/or hydrogen chloride, is added in amounts which approximate stoichiometric quantities in order to eliminate the presence of chlorine and/or hydrogen chloride in the reaction effluent, thereby also eliminating the necessity for recovering large amounts of chlorine and/or hydrogen chloride. In general, the effluent includes equilibrium amounts of hydrogen chloride and some hydrogen chloride recovery is required.

The effluent from the chlorination reaction zone is passed to a separation and recovery zone wherein allyl chloride is recovered as reaction product and propylene, unreacted propane and propyl chloride is recovered for recycle to the chlorination reaction zone.

The reaction effluent from the chlorination reaction zone generally also includes 1- and/or 2-chloropropylene which is recovered from the reaction effluent and hydrochlorinated with hydrogen chloride to dichloropropane. The hydrogen chloride is employed in about stoichiometric proportions and may be introduced as either fresh feed and/or as hydrogen chloride generated from the dehydrochlorination of dichloropropane. The hydrogen chloride for the hydrochlorination is preferably recycle hydrogen chloride generated in the dehydrochlorination of dichloropropane. The feed to the hydrochlorination reaction zone may also include 2-chloropropane which is produced in the chlorination reaction zone and such 2-chloropropane passes through the hydrochlorination reaction zone without being reacted. The isomers of allyl chloride are hydrochlorinated to dichloropropane and in the subsequent dehydrochlorination allyl chloride is produced from the dichloropropane. Accordingly, the combined hydrochlorination and dehydrochlorination steps has the net result of converting the isomers of ally chloride to allyl chloride.

Dichloropropane recovered from the chlorination reaction effluent is combined with the dichloropropane generated in the hydrochlorination reaction zone and introduced into a dehydrochlorination reaction zone wherein the dichloropropane is dehydrochlorinated to chloropropylene, including allyl chloride, and in addition, 1-chloropropylene and/or 2-chloropropylene. If the feed to the hydrochlorination reaction zone also included 2-chloropropane, and such 2-chloropropane is dehydrochlorinated to propylene. The dehydrochlorination is effected as hereinabove described.

The allyl chloride is recovered as reaction product from the dehydrochlorination reaction effluent. The 1-chloropropylene and/or 2-chloropropylene is recovered from the dehydrochlorination reactor effluent and introduced into the hydrochlorination reaction zone and the propylene, if any, is recovered from the dehydrochlorination reaction effluent and introduced into the chlorination reaction zone.

The hydrogen chloride generated during the dehydrochlorination represents those chlorine values obtained from the dichloropropane generated in the chlorination and hydrochlorination reaction zones. Thus, a portion of this hydrogen chloride is recycled to the hydrochlorination reaction zone to meet the hydrogen chloride requirements thereof, with the remaining portion being recycled to the chlorination reaction zone. Alternatively, all of the hydrogen chloride could be recycled to the chlorination reaction zone in which case a portion of required fresh feed chlorine values would be introduced, as hydrogen chloride, into the hydrochlorination reaction zone.

The reaction effluent from the chlorination reaction zone may also include some chlorinated C3 hydrocarbons having three or more chlorine atoms and such chlorinated C3 hydrocarbons may be combusted to recover chlorine values, as hydrogen chloride and/or chlorine, therefrom. The combustion effluent is then introduced into the oxidation reaction zone wherein such chlorine values are recovered by contact with the molten salt. This procedure is similar to the procedure, described in U.S. application Ser. No. 95,030 filed on Dec. 4, 1970, for recovering chlorine values by combustion of chlorinated hydrocarbons in a process for producing vinyl chloride.

It should be readily apparent that in accordance with the preferred embodiment allyl chloride is effectively produced from propane, oxygen and chlorine and/or hydrogen chloride with reaction intermediates, being ultimately converted to allyl chloride. It is to be understood, however, that, if desired some reaction intermediates may be recovered as co-reaction product.

It is also to be understood that the propane fresh feed could also contain other compounds, such as, for example, propylene.

The invention will now be further described with reference to an embodiment thereof illustrated in the accompanying drawings. It is to be understood however, that the scope of the invention is not to be limited thereby. It is further to be understood that the molten copper chloride salts are highly corrosive and, accordingly, the processing equipment must be suitably protected; e.g., the reactors may be lined with ceramic. Similarly, if pumps are used for transporting the molten salts they must also be protected. The molten salts, however, are preferably transferred between the reactors by the use of gas lifts, as known in the art.

Referring now to FIG. 1, a molten chloride salt, such as a mixture of potassium chloride, cuprous chloride and cupric chloride in line 10 is introduced into the top of the reaction portion of an oxidation vessel 11 maintained, as hereinabove described, at temperatures and pressures suitable for oxidizing the molten salt. A compressed oxygen-containing gas, such as air, in line 12 is introduced into the bottom of vessel 11 and is passed in countercurrent contact to the descending molten salt resulting in oxidation of the salt to produce copper oxychloride with the concurrent evolution of heat. In addition, combustion effluent resulting from the combustion of chlorinated C3 hydrocarbons having three or more chlorine atoms, including hydrogen chloride and/or chlorine may be introduced into vessel 11 through line 12a.

An effluent gas, comprised essentially of the nitrogen introduced as part of the air, (the effluent could also include combustion products, such as carbon oxide and water vapor if a combustion effluent gas is introduced through line 12a) rises into the top of the vessel 11 wherein the effluent gas is combined with lift gas, as hereinafter described, introduced through line 13. The effluent gas is directly contacted in the top of vessel 11 with a spray of quench liquid, in particular introduced through line 14 to cool the effluent gas and thereby eliminate any vaporized and entrained salts therefrom. The effluent gas, now containing vaporized quench liquid, is withdrawn from vessel 11 through line 15 and introduced into a direct contact quench tower 16, of a type known in the art wherein the effluent gas is cooled by direct contact with a suitable quench liquid, in particular, dilute hydrochloric acid, introduced through line 17 to thereby remove vaporized quench liquid from the effluent gas.

The quench liquid is withdrawn from the bottom of tower 16 through line 18 and a first portion passed through line 14 for quenching the effluent gas in vessel 11. A second portion of the quench liquid is passed through line 19, containing a cooler 21 for introduction into the quench tower 16 through line 17.

An effluent gas, comprised essentially of nitrogen, is withdrawn from quench tower 16 through line 22 and a portion thereof purged through line 23. The remaining portion of the nitrogen effluent gas is compressed in compressor 24 and the temperature thereof regulated in heat exchanger 65 prior to passage through lines 25 and 26 for use as a lift gas for transporting molten salt, as hereinafter described.

The molten salt, now containing copper oxycloride, is withdrawn from the bottom of vessel 11 through line 31 and lifted by the lift gas in line 25 into a separation vessel 32 positioned adjacent the top of the reaction portion of a reaction vessel 33. In separator 32, the molten salt is separated from the lift gas, with the separated lift gas being withdrawn through line 35 and combined with lift gas from the oxidation reactor for introduction into the quenching portion of vessel 11 through line 13.

Fresh feed propane in line 44, fresh feed chlorine and/or hydrogen chloride in line 43, recycle hydrogen chloride from the dehydrochlorination reaction, in line 43a, obtained as hereinafter described, and recycle propane, propylene and 1-chloropropane recycle in line 45, are introduced into the bottom of the reaction vessel 33 and contacted therein by the descending molten salt to effect chlorination of the fresh and recycle feed.

The reactor 33 is operated at processing conditions, as hereinabove described, and a reaction effluent including chlorinated propanes, propylene and water vapor, some hydrogen chloride (generally corresponding to equilibrium amounts of hydrogen chloride) and carbon oxides is directly contacted in the top of reactor 33 with a quench liquid, such as chlorinated propane, introduced through line 53 to cool the effluent gas and thereby eliminate vaporized and entrained salts therefrom. The effluent gas, now containing vaporized quench liquid is withdrawn from vessel 33 through line 54 for introduction into a separation and recovery zone.

A molten salt is withdrawn from the bottom of reactor 33 through line 61 and lifted by lift gas in line 26 into a separation vessel 62 positioned adjacent the top of reactor 11. In separator 62, the molten salt is separated from the lift gas and introduced through line 10 into vessel 11. The lift gas is withdrawn from separator 62 through line 64 and combined with the lift gas in line 35 for introduction into the top quenching section of vessel 11 through line 13.

Referring now to FIG. 2, the reaction effluent in line 54 is cooled in condenser 110, primarily to condense a portion of the water therefrom ( the condensed water would also contain hydrogen chloride, if present ), the aforesaid cooling also resulting in the condensation of chlorinated hydrocarbons, including the chlorinated hydrocarbons used as quench liquid. The condensed water and chlorinated hydrocarbons are separated in a separator 111, with a water phase being withdrawn through line 112 and a chlorinated hydrocarbon phase being withdrawn through line 113. A portion of the chlorinated hydrocarbon in line 113 is recycled through line 53 as quench liquid for reactor 33. Alternatively, all of such chlorinated hydrocarbons, if required, may be recycled as quench liquid. The water phase in line 112, is stripped of entrained and dissolved chlorinated hydrocarbon in a stripping column (not shown) and the recovered chlorinated hydrocarbons (from the stripping column) in line 112a are combined with the chlorinated hydrocarbons in line 113. Depending on the amount of hydrogen chloride present in the water, the water may also be treated to recover hydrogen chloride or a concentrated solution of hydrogen chloride.

The remaining portion of the gaseous effluent in line 114 is optionally passed through an alkali scrubbing zone of a type known in the art, schematically indicated as 115, to remove any remaining hydrogen chloride therefrom.

The gaseous effluent from the alkali scrubbing zone 115, if used, in line 116 is generally passed through a further cooling and separation zone, schematically indicated as 117, to condense further water and chlorinated hydrocarbons therefrom; an acid gas removal zone 118, of a type known in the art, to remove carbon oxide, and a drier 119, to remove remaining water. The chlorinated hydrocarbons in line 113 and chlorinated hydrocarbons separated in zone 117 are combined and dried in drier 120, for subsequent introduction into a fractional distillation column 123. Alternatively, if required, a portion of the chlorinated hydrocarbons recovered in zone 117, may be recycled as quench liquid to reactor 33. The water separated in zone 117, may be passed to a stripping column to recover any chlorinated hydrocarbons with such recovered chlorinated hydrocarbons also being introduced into column 123.

The product in line 121, essentially free of water and carbon oxides, is combined with product in line 122 recovered from the dehydrochlorination reactor, as hereinafter described, and introduced into a fractional distillation column, schematically indicated as 123, designed and operated to separate propane, and propylene as overhead. The propane and propylene recovered as overhead in line 124 is combined with propyl chloride, in line 125, obtained as hereinafter described, and the combined stream introduced into reactor 33 through line 45.

The bottoms from fractionation 123, in line 126, is introduced into a fractional distillation column, schematically indicated as 127, designed and operated to recover the isomers of allyl chloride as overhead. The overhead may further include 2-chloropropane. The overhead is withdrawn from fractionation column 127 through line 128 for passage to a hydrochlorination reactor, as hereinafter described.

The bottoms from fractionation 127, in line 129, is introduced into a fractional distillation column, schematically indicated as 131, designed and operated to recover allyl chloride as overhead. The allyl chloride overhead in line 132 is recovered as reaction product.

The bottoms from fractionation column 131, in line 133, is introduced into a fractional distillation column, schematically indicated as 134, designed and operated to recover propyl chloride overhead. The propyl chloride overhead in line 125 is combined with the overhead in line 124 for recycle to reactor 33 through line 45.

The bottoms from column 134 in line 135 is introduced into a fractional distillation column, schematically indicated as 136, designed and operated to recover dichloropropane as overhead. The dichloropropane overhead in line 137 is passed to a dehydrochlorination reactor as hereinafter described.

The bottoms from fractionation 136, in line 138, containing one or more chlorinated C3 hydrocarbons having three or more chlorine atoms, is introduced into a combustion zone, schematically indicated as 139, along with molecular oxygen, in line 141, to effect combustion of such chlorinated hydrocarbons to produce an effluent containing chlorine and/or hydrogen chloride. The effluent from combustion zone 139 in line 12a is introduced into reactor 11 to recover the chlorine and/or hydrogen chloride.

The overhead from fractionator 127, in line 128 containing isomers of allyl chloride, is introduced into a hydrochlorination reactor 151 along with hydrogen chloride in line 152. The hydrochlorination reactor 151 is operated, as known in the art, to hydrochlorinate the isomers of allyl chloride to dichloropropane. The 2-chloropropane, is present, is passed, unreacted through the reactor 151.

The effluent from reactor 151, containing dichloropropane, in line 153 is combined with the dichloropropane overhead in line 137 and the combined stream, in line 154, is introduced into a dehydrochlorination reaction zone, schematically indicated at 155. The dehydrochlorination reaction zone 155, as shown, is a conventional thermal dehydrochlorination reaction zone, but it is to be understood that dehydrochlorination may be effected by the use of molten salts. The dehydrochlorination reaction zone is operated at conditions known in the art to dehydrochlorinate dichloropropane to chloropropylene, including allyl chloride and isomers thereof.

A reaction effluent, containing allyl chloride and its isomers, hydrogen chloride, unreacted dichloropropane, if any, 2-chloropropane, if any, the dehydrochlorination reaction product of 2-chloropropane; i.e., propylene, if any, is withdrawn from reaction zone 155 through line 156 and introduced into a fractional distillation column, schematically indicated as 157, designed and operated to recover hydrogen chloride as overhead.

The hydrogen chloride overhead from column 157, in line 158, is passed to the hydrochlorination reactor 151 through line 152 and/or the chlorination reactor 33 through line 43a. The hydrogen chloride passed through line 152 is sufficient to meet the hydrochlorination requirements for reactor 151. Alternatively, all of the hydrogen chloride in line 158 may be passed to the chlorination reactor 33 and fresh feed hydrogen chloride employed to meet the requirements for hydrochlorination reactor 151.

The bottoms from column 157, in line 122, including the remainder of the effluent from the dehydrochlorination reaction zone 155, is combined with the effluent from the chlorination reactor 33, in line 121, for recovery of the various components.

Numerous modifications and variations of the hereinabove described embodiment are possible within the spirit and scope of the present invention. Thus, for example, the separation and recovery of various components may be effected other than as particularly described. Various modifications of the hereinabove described embodiment is deemed to be well within the scope of those skilled in the art from the teachings herein.

The invention will be further described with respect to the following example with further illustrates the present invention. It is to be understood that the scope of the invention is not to be limited by this example.

EXAMPLE

A molten salt, comprised of 52% cuprous chloride, 18% cupric chloride and 30% potassium chloride, all by weight, is oxidized with oxygen enriched air in reactor 11, operated at a temperature of 860°F. and a pressure of 60 psia to produce a molten salt mixture containing 2.5%, by weight, copper oxychloride.

The molten salt is circulated from reactor 11 to reactor 33, operated at a temperature of 860°F. and a pressure of 60 psia. The salt is contacted with net fresh feed of 20 parts by volume propane and 8.5 parts by volume of chlorine. In addition, propyl chloride, propylene, and unreacted propane is recycled through line 45 and hydrogen chloride in excess of that required for the hydrochlorination, recovered from reactor 155 is introduced through line 43a.

The hydrochlorinator 151 is operated with an antimony chloride catalyst at a temperature of 900°F. and a pressure of 25 psia. The feed to reactor 151 is comprised of 8.5 parts of 1- and 2-; $C_3H_5Cl$ 1.0 part 2-$C_3H_7Cl$ and 8.5 parts HCl, all by volume.

The dehydrochlorinator 155 is operated at a temperature of 900°F. and a pressure of 25 psia with the feed thereto of dichloropropanes (Lines 137 and 153) being 12.5 parts and of 2-$C_3H_7Cl$ being 1 part, all by volume.

The net yield of allyl chloride (produced in reactor 33 and dehydrochlorinator 155 and recovered in column 131) is 17.0 parts by volume. The selectivity to allyl chloride based on propane feed is 85%.

The present invention is particularly advantageous in that allyl chloride may be produced by the chlorination of propane with the added advantage of essentially no net production of intermediate by-products.

Numerous modifications and variations of the invention are possible in light of the above teachings and, therefore, within the scope of the appended claims the invention may be practised other than as particularly described.

What is claimed is:

1. A process for producing allyl chloride, comprising:
   a. contacting in a first reaction zone propane and a member selected from the group consisting of chlorine, hydrogen chloride and mixtures thereof with a molten mixture comprising the higher and lower valent chlorides of a multivalent metal and the oxychloride of the metal to produce a first effluent comprising allyl chloride, isomers of allyl chloride, and dichloropropane;
   b. recovering dichloropropane and isomers of allyl chloride from the first effluent;
   c. introducing isomers of allyl chloride recovered from the first effluent into a second reaction zone wherein the isomers are hydrochlorinated to dichloropropane by contact with hydrogen chloride;
   d. dehydrochlorinating in a third reaction zone dichloropropane produced in the second reaction zone and dichloropropane recovered from the first effluent to produce a second effluent comprising allyl chloride, hydrogen chloride and isomers of allyl chloride;
   e. recovering hydrogen chloride and isomers of allyl chloride from the second effluent;
   f. recycling hydrogen chloride recovered from the second effluent to at least one of the first and second reaction zones;
   g. recovering allyl chloride from the first and second effluents as product; and
   h. recycling isomers of allyl chloride recovered from the second effluent to step (c).

2. The process of claim 1 wherein the multivalent metal chloride is selected from the group consisting of copper, chromium, cobalt, manganese and iron.

3. The process of claim 2 wherein the contacting of step (a) is effected at a temperature from about 700°F. to about 950°F.

4. The process of claim 3 wherein hydrogen chloride recovered from the second effluent is passed to the second reaction zone to meet hydrogen chloride requirements therefore, with remaining hydrogen chloride being passed to the first reaction zone.

5. The process of claim 4 wherein molten mixture recovered from the first reaction zone is passed to a fourth reaction zone wherein the molten mixture is contacted with molecular oxygen to produce oxychloride and passing molten mixture, containing oxychloride, from said fourth reaction zone to said first reaction zone.

6. The process of claim 5 wherein the molten mixture, includes, as a melting point depressant, a member selected from the group consisting of the alkali metal chlorides and the heavy metal chlorides of Groups I – IV of the Periodic Table.

7. The process of claim 6 wherein the first effluent further comprises unreacted propane, propylene and propyl chloride which are recovered and recycled to the first reaction zone.

8. The process of claim 7 wherein the melting point depressant is potassium chloride.

9. The process of claim 3 wherein the multivalent metal chloride is copper chloride.

10. A continuous process for producing allyl chloride, comprising:
   a. contacting in a first reaction zone propane and a member selected from the group consisting of chlorine, hydrogen chloride and mixtures thereof with a molten mixture comprising cuprous chloride, cupric chloride and copper oxychloride to produce a first effluent comprising allyl chloride, isomers of allyl chloride dichloropropanes, propylene, unreacted propane and propyl chloride;
   b. recovering and recycling to the first reaction zone propylene, unreacted propane and propyl chloride from the first effluent;
   c. recovering isomers of allyl chloride and dichloropropane from the first effluent;
   d. hydrochlorinating in a second reaction zone recovered isomers of allyl chloride with hydrogen chloride to produce dichloropropane;
   e. dehydrochlorinating in a third reaction zone dichloropropane recovered from the first effluent and dichloropropane produced in the second reaction zone to produce a second effluent comprising hydrogen chloride, allyl chloride and isomers of allyl chloride;
   f. recovering and passing to the second reaction zone isomers of allyl chloride present in the second effluent;
   g. recovering and passing to at least one of said first and second reaction zones hydrogen chloride present in the second effluent;
   h. recovering as reaction product allyl chloride present in the first and second effluent;
   i. contacting melt from the first reaction zone in a fourth reaction zone with molecular oxygen to produce copper oxychloride; and
   j. passing melt from the fourth reaction zone to the first reaction zone.

11. The process of claim 10 wherein the first reaction zone is operated at a temperature from about 700°F. to about 950°F.

12. The process of claim 11 wherein the second reaction zone is operated at a temperature from about 100°F. to about 400°F.

13. The process of claim 12 wherein the third reaction zone is operated at a temperature from about 500°F. to about 1,000°F.

14. The process of claim 13 wherein hydrogen chloride recovered from the second effluent is passed to both the first and second reaction zones.

15. The process of claim 14 wherein the molten mixture further comprises, as a melting point depressant, a member selected from the group consisting of the alkali metal chlorides and the heavy metal chlorides of Groups I – IV of the Periodic Table.

16. The process of claim 15 wherein the melting point depressant is potassium chloride.

17. The process of claim 16 wherein the molten mixture contains from about 17% to about 35%, by weight, of cupric chloride.

18. The process of claim 16 wherein the first effluent further comprises at least one $C_3$ chlorinated hydrocarbon substituted with at least three chlorine atoms, recovering and burning said at least one $C_3$ chlorinated hydrocarbon to produce a combustion effluent containing gaseous chlorine values and introducing the combustion effluent into the fourth reaction zone to recover the gaseous chlorine values.

* * * * *